(12) United States Patent
Hamilton

(10) Patent No.: US 12,213,405 B1
(45) Date of Patent: Feb. 4, 2025

(54) ERGONOMIC GRIP FOR WEED TRIMMER

(71) Applicant: Robbie Hamilton, Huntsville, AL (US)

(72) Inventor: Robbie Hamilton, Huntsville, AL (US)

( * ) Notice: Subject to any disclaimer, the term of this patent is extended or adjusted under 35 U.S.C. 154(b) by 325 days.

(21) Appl. No.: 17/711,169

(22) Filed: Apr. 1, 2022

Related U.S. Application Data

(63) Continuation-in-part of application No. 17/113,767, filed on Dec. 7, 2020, now Pat. No. 11,730,081, which is a continuation of application No. 16/399,464, filed on Apr. 30, 2019, now abandoned.

(60) Provisional application No. 62/764,427, filed on Aug. 2, 2018, provisional application No. 62/762,861, filed on May 24, 2018.

(51) Int. Cl.
*A01D 34/90* (2006.01)
*A01B 1/02* (2006.01)
*A01D 34/82* (2006.01)
*B25F 5/02* (2006.01)

(52) U.S. Cl.
CPC ............ *A01D 34/902* (2013.01); *A01B 1/026* (2013.01); *A01D 34/824* (2013.01); *B25F 5/026* (2013.01); *A01D 34/90* (2013.01)

(58) Field of Classification Search
CPC .... A01D 34/902; A01D 34/824; A01D 34/90; A01B 1/026; B25F 5/024; B25F 5/026; F16B 7/0426; F16B 7/0406; F16B 7/0433; F16C 11/103
See application file for complete search history.

(56) References Cited

U.S. PATENT DOCUMENTS

| | | | | |
|---|---|---|---|---|
| 85,956 | A * | 1/1869 | Pinkham | A47L 11/4038 15/247 |
| 572,851 | A * | 12/1896 | Young | F16B 4/004 16/427 |
| 577,220 | A * | 2/1897 | Whitehead | B25J 1/04 24/339 |
| 1,534,075 | A * | 4/1925 | Parrish | A01B 1/026 294/58 |
| 1,586,056 | A | 5/1926 | Walsh | |
| 2,244,585 | A * | 6/1941 | Tweit | A01B 1/00 294/58 |
| 3,781,991 | A * | 1/1974 | Stretton | A01D 34/902 30/276 |
| 4,179,805 | A * | 12/1979 | Yamada | B27B 17/0008 30/296.1 |

(Continued)

*Primary Examiner* — Jeffrey O'Brien
(74) *Attorney, Agent, or Firm* — AdamsIP, LLC

(57) ABSTRACT

The present disclosure provides an accessory attachment apparatus for use in conjunction with a handle mounting apparatus. Each of the accessory attachment apparatus and the handle mounting apparatus are configured to be coupled to a main shaft of a weed trimmer. The accessory attachment apparatus may include a shaft collar clamp configured to be coupled to the main shaft and including at least one attachment hole for receiving a coupling rod extending from an accessory attachment member of the accessory attachment apparatus. The accessory attachment member may be coupled to a mounting portion of the handle mounting apparatus. A receiving portion of the handle mounting apparatus may be pivotally coupled to the mounting portion and may be configured to receive a shaft of a handle accessory designed for improved control and ergonomics of the weed trimmer.

13 Claims, 15 Drawing Sheets

(56) References Cited

U.S. PATENT DOCUMENTS

| | | | | |
|---|---|---|---|---|
| 4,226,021 | A * | 10/1980 | Hoff | A01D 34/902 30/276 |
| 4,282,652 | A * | 8/1981 | Ballas, Sr. | A01D 34/902 30/276 |
| 4,288,171 | A * | 9/1981 | Kottke | A01G 3/00 403/389 |
| 4,364,435 | A * | 12/1982 | Tuggle | A01G 3/062 30/296.1 |
| 4,428,697 | A * | 1/1984 | Ruland | F16D 1/0864 403/313 |
| RE32,266 | E * | 10/1986 | Tuggle | A01D 34/84 172/15 |
| 4,838,465 | A * | 6/1989 | Metzger | E04G 21/04 222/526 |
| 4,958,407 | A * | 9/1990 | Johnson | A01B 1/22 294/58 |
| 5,065,475 | A * | 11/1991 | Watt | B25G 1/00 294/58 |
| 5,131,116 | A * | 7/1992 | Bowdler | B60N 2/06 16/427 |
| 5,411,305 | A * | 5/1995 | Revoldt | B25G 3/24 294/58 |
| 5,451,085 | A * | 9/1995 | Wagner | A01B 1/22 294/58 |
| 5,496,085 | A * | 3/1996 | Middleton | A01B 1/026 294/58 |
| 5,499,852 | A * | 3/1996 | Seigendall | B25G 1/00 294/58 |
| 5,661,960 | A * | 9/1997 | Smith | A01D 34/902 56/DIG. 18 |
| 5,740,613 | A * | 4/1998 | Swistun | A01D 34/902 30/296.1 |
| 5,771,535 | A * | 6/1998 | Blessing | B25G 3/26 16/421 |
| 6,056,668 | A * | 5/2000 | Nagashima | A01G 3/062 74/489 |
| 6,082,087 | A * | 7/2000 | Tada | A01D 34/902 56/DIG. 18 |
| 6,283,522 | B1 * | 9/2001 | Renaud | B25G 1/00 294/58 |
| 6,485,076 | B1 * | 11/2002 | Chang | B25G 1/00 294/58 |
| 6,499,172 | B1 * | 12/2002 | McCracken | B24B 23/005 15/97.1 |
| 6,536,117 | B2 * | 3/2003 | Schweigert | A01D 34/902 30/276 |
| 6,581,246 | B1 * | 6/2003 | Polette | A01D 34/90 16/444 |
| 6,701,623 | B2 * | 3/2004 | Sanders | A01G 3/062 30/296.1 |
| 6,745,549 | B1 * | 6/2004 | Taylor | A01D 34/001 56/12.7 |
| 7,331,620 | B2 * | 2/2008 | Wang | A01B 1/026 403/379.5 |
| 7,882,596 | B2 * | 2/2011 | Hixon | B25G 1/00 16/446 |
| 8,206,200 | B2 * | 6/2012 | Stott | B24B 7/184 451/344 |
| 8,562,238 | B2 * | 10/2013 | Hasei | B62K 21/16 403/396 |
| 8,667,648 | B2 * | 3/2014 | Vierck | A01D 34/416 30/296.1 |
| 9,267,537 | B2 * | 2/2016 | Plomteux | F21V 21/26 |
| 9,491,896 | B1 * | 11/2016 | Hagen | A01B 1/026 |
| 9,775,272 | B1 * | 10/2017 | Gilbert | B25G 1/06 |
| 9,918,429 | B1 * | 3/2018 | Di Lallo | B25F 5/026 |
| 9,943,953 | B2 * | 4/2018 | Fritz | B25G 1/06 |
| 10,385,894 | B2 * | 8/2019 | Finch | F16B 2/06 |
| 10,502,607 | B2 * | 12/2019 | Halliburton | F16B 2/22 |
| 10,694,672 | B2 * | 6/2020 | Eiserer | A01D 34/416 |
| 11,045,937 | B2 * | 6/2021 | Hoffman | A01B 42/00 |
| 11,780,073 | B2 * | 10/2023 | Hurt | A01B 1/026 16/430 |
| 2003/0057721 | A1 * | 3/2003 | Ducklow | B25G 1/00 294/58 |
| 2003/0074765 | A1 * | 4/2003 | Quimby | A01B 1/00 16/426 |
| 2003/0126749 | A1 * | 7/2003 | Sanders | A01G 3/062 30/296.1 |
| 2006/0123634 | A1 | 6/2006 | Peterson et al. | |
| 2006/0123635 | A1 * | 6/2006 | Hurley | A01D 34/902 30/276 |
| 2009/0038283 | A1 * | 2/2009 | Hurley | A01D 34/84 56/12.7 |
| 2009/0188354 | A1 * | 7/2009 | Harris | A01D 34/902 172/14 |
| 2009/0272778 | A1 * | 11/2009 | Hurley | A45F 3/14 224/637 |
| 2009/0300885 | A1 * | 12/2009 | Hung | A01D 34/90 24/3.1 |
| 2010/0031515 | A1 * | 2/2010 | Hurley | A01D 34/902 30/276 |
| 2010/0088902 | A1 * | 4/2010 | Hurley | A01D 34/902 30/286 |
| 2011/0203118 | A1 * | 8/2011 | Saito | A01D 34/902 30/276 |
| 2012/0085205 | A1 * | 4/2012 | Quick | A01D 34/824 81/489 |
| 2012/0168289 | A1 * | 7/2012 | Ito | A01D 34/902 200/61.85 |
| 2012/0312572 | A1 * | 12/2012 | Nemetz | B25F 5/006 248/220.22 |
| 2013/0142563 | A1 * | 6/2013 | Sumi | A01D 34/902 403/109.1 |
| 2013/0247386 | A1 * | 9/2013 | Ishikawa | A01D 34/902 30/296.1 |
| 2014/0013542 | A1 * | 1/2014 | Wang | A01D 34/90 16/429 |
| 2014/0208597 | A1 * | 7/2014 | Zhou | A01D 34/90 30/276 |
| 2014/0260839 | A1 * | 9/2014 | Hurley | B25F 5/026 81/489 |
| 2015/0313079 | A1 * | 11/2015 | Wang | A01D 34/90 30/275.4 |
| 2015/0334917 | A1 * | 11/2015 | Durden | A01D 34/902 16/24 |
| 2016/0258489 | A1 * | 9/2016 | Yao | F16D 1/108 |
| 2017/0273239 | A1 * | 9/2017 | Ota | A01D 34/68 |
| 2018/0103584 | A1 * | 4/2018 | Orton | A01D 34/416 |
| 2018/0332766 | A1 * | 11/2018 | Ackerman | A01D 34/902 |
| 2018/0359899 | A1 * | 12/2018 | Cote | A01B 1/026 |
| 2020/0072392 | A1 * | 3/2020 | Foerg | F16L 3/13 |
| 2020/0171644 | A1 * | 6/2020 | Piotrowski | A01B 1/026 |
| 2020/0296891 | A1 * | 9/2020 | Bohrer | B25F 5/026 |
| 2024/0198508 | A1 * | 6/2024 | Losch | B25F 5/026 |

* cited by examiner

ERGONOMIC GRIP FOR WEED TRIMMER

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent applications which are hereby incorporated by reference: U.S. patent application Ser. No. 17/113,767 filed Dec. 7, 2020, entitled "Ergonomic Grip For Weed Trimmer," which claims priority to U.S. patent application Ser. No. 16/399,464 filed Apr. 30, 2019, entitled "Ergonomic Grip For Weed Trimmer," which claims priority to U.S. Provisional Patent Application Ser. No. 62/762,861 filed May 24, 2018 and U.S. Provisional Patent Application Ser. No. 62/764,427 filed on Aug. 2, 2018.

BACKGROUND

1. Field of the Invention

This device is an attachment that a user can install onto the main shaft of a weed trimmer, edger, or the like. The attachment may be installed by clamping it onto the length of the main shaft. The attachment allows a user to ergonomically grip and control the weed trimmer or edger so that the user maintains a more upright position alleviating or reducing back strain and back injury.

2. Description of the Prior Art

A number of grass trimmer grips are disclosed in the prior art for gripping a weed trimmer, edger, or similar device. All grass trimmers and grass edgers commercially available include a standard grip that creates a fulcrum point forcing a user to bend at the waist to trim grass, causing user fatigue.

Di Lallo (U.S. Pat. No. 9,918,429 B1) discloses an ergonomic trimmer handle that attaches to the main shaft of a grass trimmer The trimmer handle comprises a lateral bar that runs perpendicular to the main shaft. The lateral bar extends out approximately two feet. This allows a user to grip both the attachment and the handle installed on the grass trimmer The perpendicular configuration allows a user a more ergonomic grip. This device provides a means for a user to manipulate a grass trimmer with two hands. A standard grip requires a user to bend at the waist to trim the grass, causing user fatigue.

Smith et al. (U.S. Pat. No. 5,661,960) discloses a handle assembly that provides a forearm rest, a first handle in line with the forearm rest, and a second handle positioned to a side of the forearm rest and first handle. The device of Smith et al. allows a user to control a grass trimmer using two hands while the forearm of the first handle acts as a fulcrum for the device. Users of this device suffer from strain and fatigue along their forearm, which is maintained as the fulcrum of the device. Additionally, users suffer strain and fatigue at the waist because the device requires a user must rotate about the waist in a sweeping motion to cut grass. Additionally, a user must use two hands to sweep the grass trimmer from side to side. It is often difficult for a user to devote both hands to operating a grass trimmer A user may have to stop trimming grass, and put the device down to free up a hand. This device is difficult to use and requires coordination of both hands and a user's forearm to manipulate the device.

A device is needed that can allow a user to trim grass with a gas or electric-powered grass trimmer with minimal waist and arm fatigue. Additionally, an ergonomic device is needed that does not force a user to rotate about the waist reducing waist fatigue.

BRIEF SUMMARY

This device comprises a handle attachment that may be reversibly coupled to an electric-powered or gas-powered grass trimmer, grass edger, or similar tool. The handle device includes an ergonomic grip that is positioned above the standard grip provided with the grass trimmer or edger at purchase. The positioning of the ergonomic grip allows a user to hold the grass trimmer without bending at the waist. The handle attachment clamps or attaches to the main shaft of the grass trimmer or edger closer to the head of the grass trimmer or edger than the standard grip provided with the tool at the time of purchase. The clamping of the device near the head of the grass trimmer or edger moves the fulcrum of the device down the length of the main shaft allowing a user to exert better control over the trimmer or edger during use, which also permits the ergonomic handle to be positioned above the standard grip provided at the time of purchase. If the fulcrum of the grass trimmer or edger is not moved closer to the head of the tool, the ergonomic handle could not be positioned closer to the body of a user because the device would be uncontrollable.

One aspect in accordance with the embodiments disclosed herein is an attachment apparatus configured to be coupled to a main shaft of a weed trimmer. The main shaft includes a proximal end and a distal end to which the trimmer head is attached opposite the proximal end. The attachment apparatus may comprise a shaft collar clamp, an accessory attachment member, and a coupling rod. The shaft collar clamp may include a passageway configured to receive the main shaft of the weed trimmer and at least one attachment hole defined through the shaft collar clamp parallel to the passageway. The accessory attachment member may have a base portion and a semicylindrical portion extending from the base portion. The coupling rod may extend from the accessory attachment member and may configured to be received by the at least one attachment hole of the shaft collar clamp.

In certain embodiments in accordance with this aspect, the passageway of the shaft collar clamp may be defined by a first semicircular portion and a second semicircular portion configured to be coupled to the first semicircular portion.

In other embodiments in accordance with this aspect, the at least one attachment hole may include a first attachment hole defined through the first semicircular portion and a second attachment hole defined through the second semicircular portion.

In other embodiments in accordance with this aspect, the accessory attachment member may include a receptacle defined at least partially in the semicylindrical portion. The coupling rod may be received by the receptacle of the accessory attachment member.

In other embodiments in accordance with this aspect, each of the at least one attachment hole of the shaft collar clamp, the receptacle of the accessory attachment member, and the coupling rod are hexagonal such that rotational movement of the accessory attachment member relative to the shaft collar clamp is prevented.

In other embodiments in accordance with this aspect, the receptacle of the accessory attachment member may extend parallel to a length of the semicylindrical portion In other embodiments in accordance with this aspect, a free end portion of the coupling rod may be configured to extend through the at least one attachment hole opposite the receptacle of the accessory attachment member. The free end portion of the coupling rod may be configured to receive a locking member configured to lock the coupling rod within the at least one attachment hole.

In other embodiments in accordance with this aspect, the locking member may comprise a cotter pin configured to be received through a bore hole defined through the free end portion of the coupling rod.

In other embodiments in accordance with this aspect, the shaft collar clamp is configured to be coupled closer to the distal end of the main shaft than to the proximal end of the main shaft.

In other embodiments in accordance with this aspect, the accessory attachment apparatus may further comprise a handle mounting bracket couplable to the accessory attachment member. The handle mounting bracket may including a first portion, a second portion, and a coupling mechanism. The a first portion may have a mounting surface configured to engage the base portion of the accessory attachment member, a channel defined in the mounting surface and configured to receive the semicylindrical portion of the accessory attachment member, and a first engagement surface positioned opposite and perpendicular to the mounting surface. The second portion may have a second engagement surface configured to engage the first engagement surface and a shaft receptacle positioned opposite and perpendicular to the second engagement surface. The coupling mechanism may be configured to couple and limit rotational movement between the first and second engagement surfaces.

In other embodiments in accordance with this aspect, each of the first and second engagement surfaces may include a plurality of radial ridges extending from an outer portion of each of the first and second engagement surfaces. The pluralities of radial ridges of the first and second engagement surfaces may define a Hirth joint.

In other embodiments in accordance with this aspect, the coupling mechanism may include a threaded fastener and a hand knob configured to engage the threaded fastener. The threaded fastener may be configured to extend through a central hole defined through each of the first and second engagement surfaces. The hand knob may be configured to selectively clamp the pluralities of radial ridges of the first and second engagement surfaces together.

In other embodiments in accordance with this aspect, the coupling mechanism may further include a spring configured to be positioned between the first and second engagement surfaces and surround the threaded fastener. The spring may be configured to separate the pluralities of radial ridges of the first and second engagement surfaces when the hand knob is loosed for adjusting an angle between first and second portions of the handle mounting bracket.

In other embodiments in accordance with this aspect, the accessory attachment member may include a plurality of attachment holes extending through the base portion on opposite sides of the semicylindrical portion. The mounting surface of the first portion of the handle mounting bracket may include a plurality of mounting holes configured to align with the plurality of attachment holes of the accessory attachment member for receiving coupling fasteners.

Another aspect in accordance with the embodiments disclosed herein is a handle mounting apparatus configured to be coupled to a main shaft of a weed trimmer. The handle mounting apparatus comprises a mounting portion, a receiving portion, and a coupling mechanism. The mounting portion may have a first mounting end and a second mounting end positioned opposite the first mounting end. The first mounting end may include a first mounting surface and a first semicylindrical channel defined in the first mounting surface. The second mounting end may include a first engagement surface oriented perpendicular to the first mounting surface. The receiving portion may have a first receiving end and a second receiving end. The first receiving end may include a second engagement surface configured to engage the first engagement surface. The second receiving end may include a shaft receptacle open in a direction perpendicular to the second engagement surface. The shaft receptacle may be configured to receive an end of the shaft of the handle. The coupling mechanism may be configured to extend through and couple each of the first and second engagement surfaces together. The coupling mechanism may further be configured to selectively enable pivotal movement between the mounting portion and the receiving portion.

In certain embodiments in accordance with this aspect, the handle mounting apparatus may further comprise a coupling member including a second mounting surface and a second semicylindrical channel defined in the second mounting surface. The second mounting surface may be configured to mate with the first mounting surface for clamping the main shaft of the weed trimmer therebetween.

In certain embodiments in accordance with this aspect, each of the first and second engagement surfaces may include a plurality of radial ridges extending from an outer portion of each of the first and second engagement surfaces. The pluralities of radial ridges of the first and second engagement surfaces may be configured to mate as a Hirth joint to prevent rotational movement between the mounting portion and the receiving portion.

In certain embodiments in accordance with this aspect, the coupling mechanism may include a threaded fastener and a hand knob configured to engage the threaded fastener. The threaded fastener may be configured to extend through a central hole defined through each of the first and second engagement surfaces. The hand knob may be configured to selectively clamp the pluralities of radial ridges of the first and second engagement surfaces together.

In certain embodiments in accordance with this aspect, the coupling mechanism may further include a spring configured to be positioned between the first and second engagement surfaces and surround the threaded fastener. the spring may be configured to separate the pluralities of radial ridges of the first and second engagement surfaces when the hand knob is loosed for adjusting an angle between the mounting portion and the receiving portion.

In certain embodiments in accordance with this aspect, the shaft receptacle may include a clamping mechanism configured to adjust a circumference of the shaft receptacle for clamping the end of the shaft of the handle within the shaft receptacle

BRIEF DESCRIPTION OF THE SEVERAL VIEWS OF THE DRAWINGS

The invention is described in detail below with reference to the appended drawings.

FIG. 1 depicts a user operating a weed trimmer wherein the weed trimmer includes a grip known in the prior art.

FIG. 2 depicts a user operating the weed trimmer of FIG. 1 wherein the Ergonomic Grip for Weed Trimmer has been installed.

FIG. 3 depicts a user operating the weed trimmer of FIG. 1 wherein an alternate embodiment of the Ergonomic Grip for Weed Trimmer has been installed.

FIG. 4 shows an angled, side view of the device of FIG. 2 with the weed trimmer handle cut away.

FIG. 5 illustrates an exploded view of the device of FIG. 4.

FIG. 6 illustrates a top view of the device of FIG. 4.

FIG. 7 is a bottom view of the device of FIG. 4.

FIG. 8 depicts a side view of the device of FIG. 4.

FIG. 9 is a side, angled view of the device with an angled shaft wherein the weed trimmer handle has been cut away.

FIG. 10 is an exploded view of FIG. 9.

FIG. 11 is a top view of the device of FIG. 9, while FIG. 12 is a side view.

FIG. 13 is a side, angled view of the device of FIG. 9 with a "T" shaped ergonomic handle.

DETAILED DESCRIPTION

Figure 1:
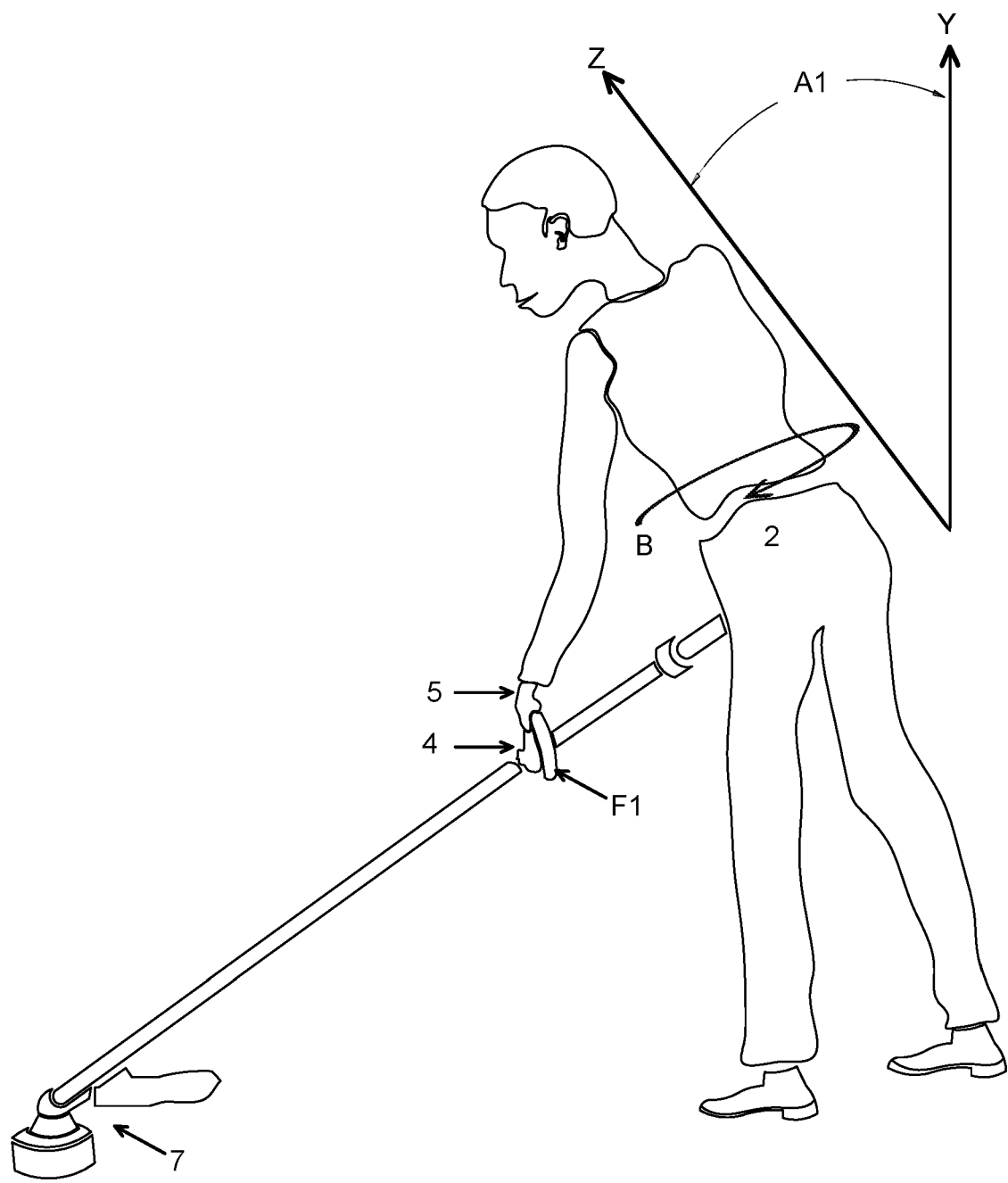
FIGS. 1 through 13 depict the Ergonomic Grip for Weed Trimmer In the FIGS.

While this invention is susceptible of embodiment in many different forms, there are shown in the drawings and will herein be described in detail, several embodiments with the understanding that the present disclosure should be considered as an exemplification of the principles of the invention and is not intended to limit the invention to the embodiments so illustrated. Further, to the extent that any numerical values or other specifics of materials, etc., are provided herein, they are to be construed as exemplifications of the inventions herein, and the inventions are not to be considered as limited thereto.

The following description and drawings are illustrative and are not to be construed as limiting. Numerous specific details are described to provide a thorough understanding of the disclosure. However, in certain instances, well-known or conventional details are not described in order to avoid obscuring the description. References to one, or an embodiment in the present disclosure, can be, but not necessarily, references to the same embodiment; and, such references mean at least one of the embodiments.

Reference in this specification to "one embodiment' or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments, but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same term can be said in more than one way.

Consequently, alternative language and synonyms may be used for any one or more of the terms discussed herein, or is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

Unless otherwise defined, all technical and scientific terms used herein have the same meaning as commonly understood by one of ordinary skill in the art to which this disclosure pertains. In the case of conflict, the present document, including definitions will control.

Figure 2:
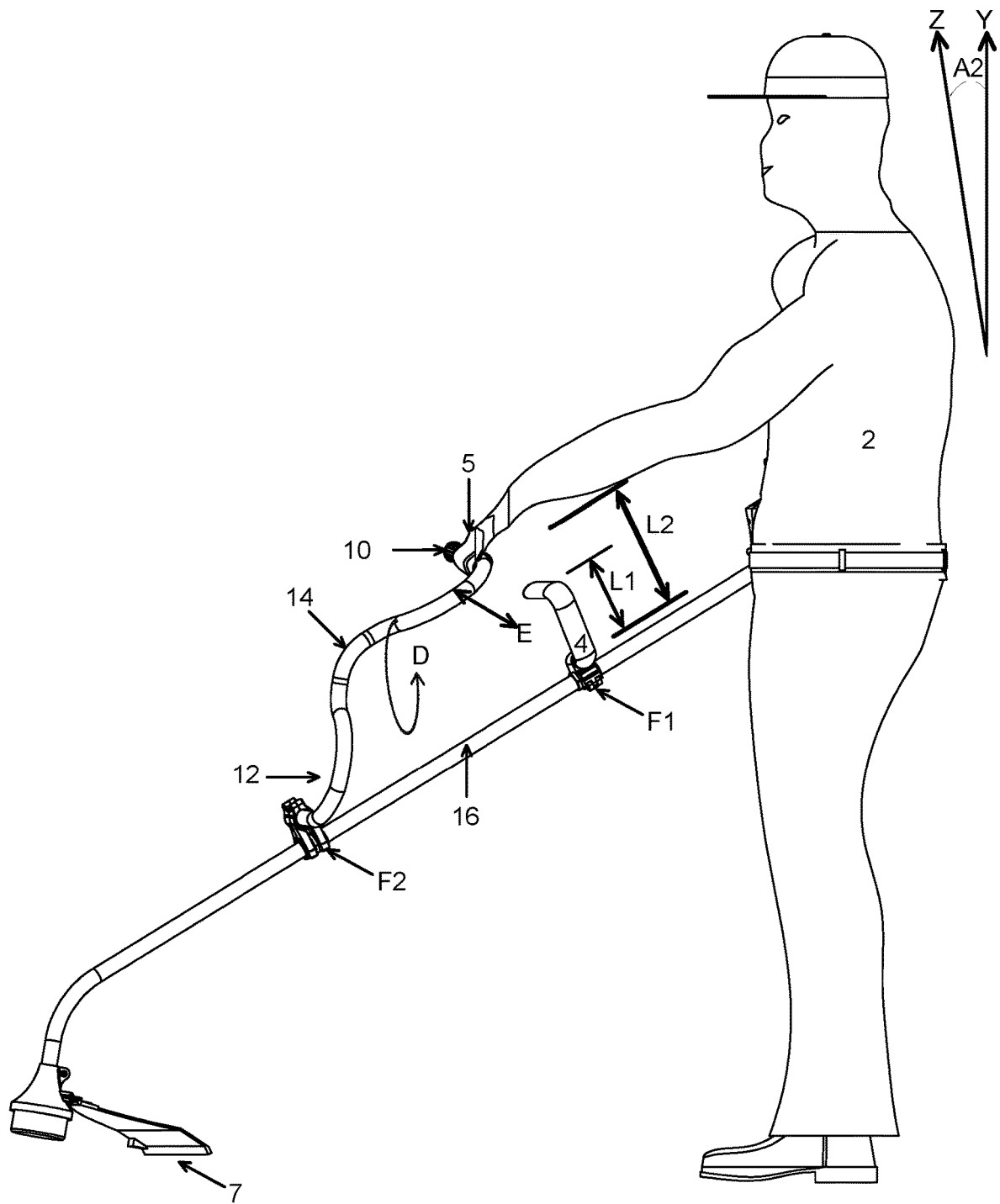
Figure 3:
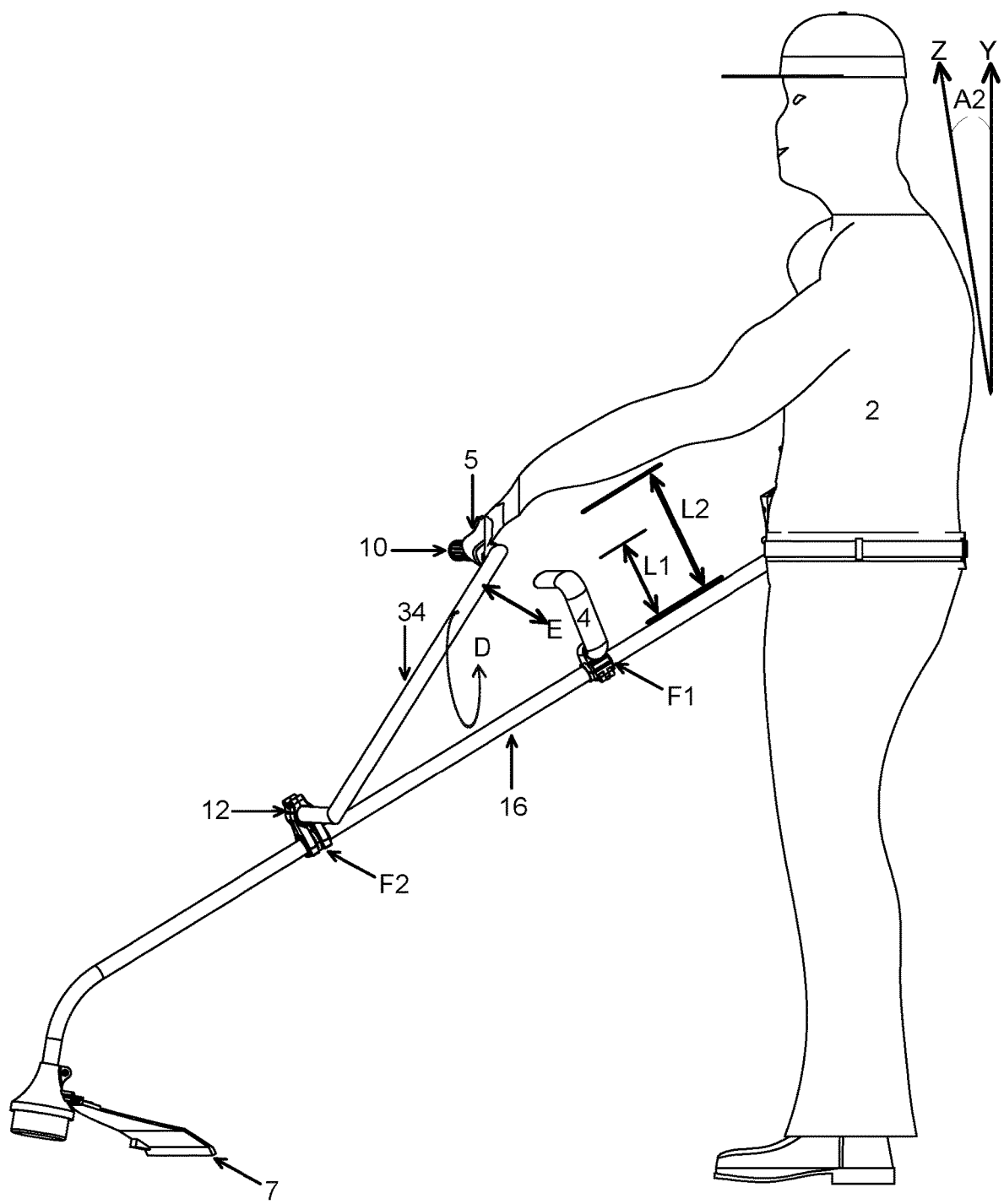

FIG. 1 depicts a commercially-available grass and weed trimmer being utilized to trim grass. The handle device disclosed herein may be formed onto a new grass and weed trimmer before the point of first sale to a consumer. Alternately, the handle device may be retrofitted onto a weed trimmer or edger after first sale to a consumer. Note that hand 5 of user 2 grips standard grip 4 that is provided at the time of purchase of the grass trimmer User 2 places his or her right hand (not shown in FIG. 1, only the left hand is shown in FIGS. 1, 2 and 3) on the end of the device that is opposite of the trimmer head 7. In order to place hand 5 upon standard grip 4, user 2 must rotate about the waist in the B direction. The rotation of user 2 about the waist in the B direction causes stress and strain on the waist and back of user 2. A device is needed that reduces the stress and strain upon the waist and back of user 2 by reducing or eliminating rotation in the B direction at the user's waist while operating a grass trimmer or edger.

The positioning of standard grip 4 along main shaft 16 of the grass trimmer creates fulcrum F1 which is the fulcrum upon which trimmer head 7 is manipulated while operating a grass trimmer or edger. The back of user 2 is rotated from line Y to line Z forming angle A1 during operation of a grass trimmer or edger. Angle A1 is the angle formed between line Z, which is a line projected from the waist of user 2, and line Y, which is perpendicular to the ground upon which user 2 is positioned. The rotation of user 2 about angle A1 causes stress and strain upon the back and arm muscles of user 2. A device is needed that reduces the stress and strain in user 2 that is caused by rotation about angle A1.

FIG. 2 illustrates user 2 with the Ergonomic Grip for Weed Trimmer attached to main shaft 16 of the grass trimmer (grass trimmer and weed trimmer are used interchangeably). The Ergonomic Grip for Weed Trimmer comprises ergonomic grip 10, clamping mechanism 12, and shaft 14. The device may be formed of aluminum, steel, fiberglass, or any material that is strong enough to support a grass trimmer or grass edger. Ergonomic grip 10 can be formed for left or right-handed individuals. Clamping mechanism 12 may be any means that couples the device onto main shaft 16 of a grass trimmer or edger. Clamping mechanism 12 may allow the device to be reversibly positioned along main shaft 16 at a position and angle that allows user 2 to more comfortably operate the weed trimmer or edger. For example, ergonomic grip 10 may be rotated in the D direction by altering the placement of clamping mechanism 12 about main shaft 16 so that ergonomic grip 10 is positioned to the side of standard grip 4. Ergonomic grip 10 may be positioned in the E direction per user 2 preference so that the ergonomic grip 10 may be parallel or perpendicular to standard grip 4. Ergonomic grip 10 may be any means that allows a user to firmly and comfortably grip the device during use.

Hand 5 of user 2 is positioned upon ergonomic grip 10, which is positioned above standard grip 4. The Ergonomic Grip for Weed Trimmer is clamped onto main shaft 16 so that fulcrum F2 is positioned closer to trimmer head 7 than fulcrum F1, which is formed at standard grip 4, allowing user 2 to have greater control over the movement of trimmer head 7 while operating the weed trimmer or edger.

The distance between hand 5 of user 2 and main shaft 16 is marked length L2. Note that length L2 is significantly longer than length L1, which is the length between a user's hand 5 while gripping standard grip 4 and main shaft 16 (as shown in FIG. 1). The positioning of the Ergonomic Grip for Weed Trimmer device at length L2 reduces the angle which user 2 must bend while trimming or edging, reducing stress and strain on the back of user 2. And, the positioning of a user's hand 5 about the Ergonomic Grip for Weed Trimmer device eliminates the need for user 2 to rotate about the waist as was seen in FIG. 1 wherein user 2 was gripping standard grip 4 (rotation about B, FIG. 1).

The back of user 2 is rotated about angle A2. Angle A2 is the angle formed between line Z, which is a line projected from the waist of user 2, and line Y, which is perpendicular to the ground upon which user 2 is positioned. Note that angle A2 is smaller (fewer radians) than angle A1, which is the angle seen when a user is gripping the trimmer or edger using standard grip 4 (shown in FIG. 1). The change in the position of the back of user 2 from angle A1 to A2 reduces stress and strain on user 2 allowing user 2 to operate the grass trimmer or edger for a longer period of time than when using standard grip 4.

Ergonomic grip 10 may be reversibly, or irreversibly, positioned along main shaft 16 via rotation of shaft 14 at clamping mechanism 12 about angle D. Angle D is the angle upon which the Ergonomic Grip for Weed Trimmer device may be rotated relative to standard grip 4 and main shaft 16. This allows user 2 to position ergonomic grip 10 parallel, perpendicular, or any position between parallel and perpendicular, to standard grip 4. Shaft 14 may be reversibly positioned along line E per user 2 preference. Line E is the line upon which ergonomic grip 10 may be positioned relative to standard grip 4 and main shaft 16. Positioning clamping mechanism 12 about main shaft 16 at fulcrum F2 allows shaft 14 to be positioned and re-positioned along line E.

FIG. 3 depicts user 2 with an alternate embodiment of the Ergonomic Grip for Weed Trimmer The Ergonomic Grip for Weed Trimmer comprises ergonomic grip 10, straight shaft 34 and clamping mechanism 12. Hand 5 of user 2 is positioned upon ergonomic grip 10, which is positioned above standard grip 4 providing user 2 with better control of trimmer head 7 while trimming and edging. The Ergonomic Grip for Weed Trimmer is clamped onto main shaft 16 so that fulcrum F2 is positioned closer to trimmer head 7 than fulcrum F1 at standard grip 4. The distance between hand 5 of user 2 and main shaft 16 is marked length L2. As noted for FIG. 2, length L2 is significantly longer than length L1, which is the length between a user's hand 5 while gripping standard grip 4 and main shaft 16 (as shown in FIG. 1). Although the position of a user's hand 5 on standard grip 4 requires user 2 to rotate about the waist when operating the grass trimmer or edger (rotation about B, FIG. 1), a user 2 gripping ergonomic grip 10 does not have to rotate about the waist, reducing stress and strain upon his or her waist and back. The back of user 2 is rotated about angle A2. Angle A2 is the angle formed between line Z, which is a line projected from the waist of user 2, and line Y, which is perpendicular to the ground upon which user 2 is positioned. As previously noted for FIG. 2, angle A2 is smaller (fewer radians) than angle A1, reducing stress and strain on the back of user 2 while trimming and edging. The position of clasping mechanism 12 creates fulcrum F2 which allows a user to have greater control while weed trimming or edging relative to fulcrum F1 formed at the point standard grip 4 is positioned upon main shaft 16.

Ergonomic grip 10 may be reversibly, or irreversibly, positioned along main shaft 16 via rotation of straight shaft 34 at clamping mechanism 12 about angle D. Angle D is the angle upon which the Ergonomic Grip for Weed Trimmer device may be rotated relative to standard grip 4 and main shaft 16. This allows user 2 to position ergonomic grip 10 parallel, perpendicular, or any position between parallel and perpendicular, to standard grip 4. Straight shaft 34 may be reversibly positioned along line E per user 2 preference. Line E is the line upon which ergonomic grip 10 may be positioned relative to standard grip 4 and main shaft 16. Positioning clamping mechanism 12 about main shaft 16 at fulcrum F2 allows straight shaft 34 to be positioned and re-positioned along line E.

Figure 4:
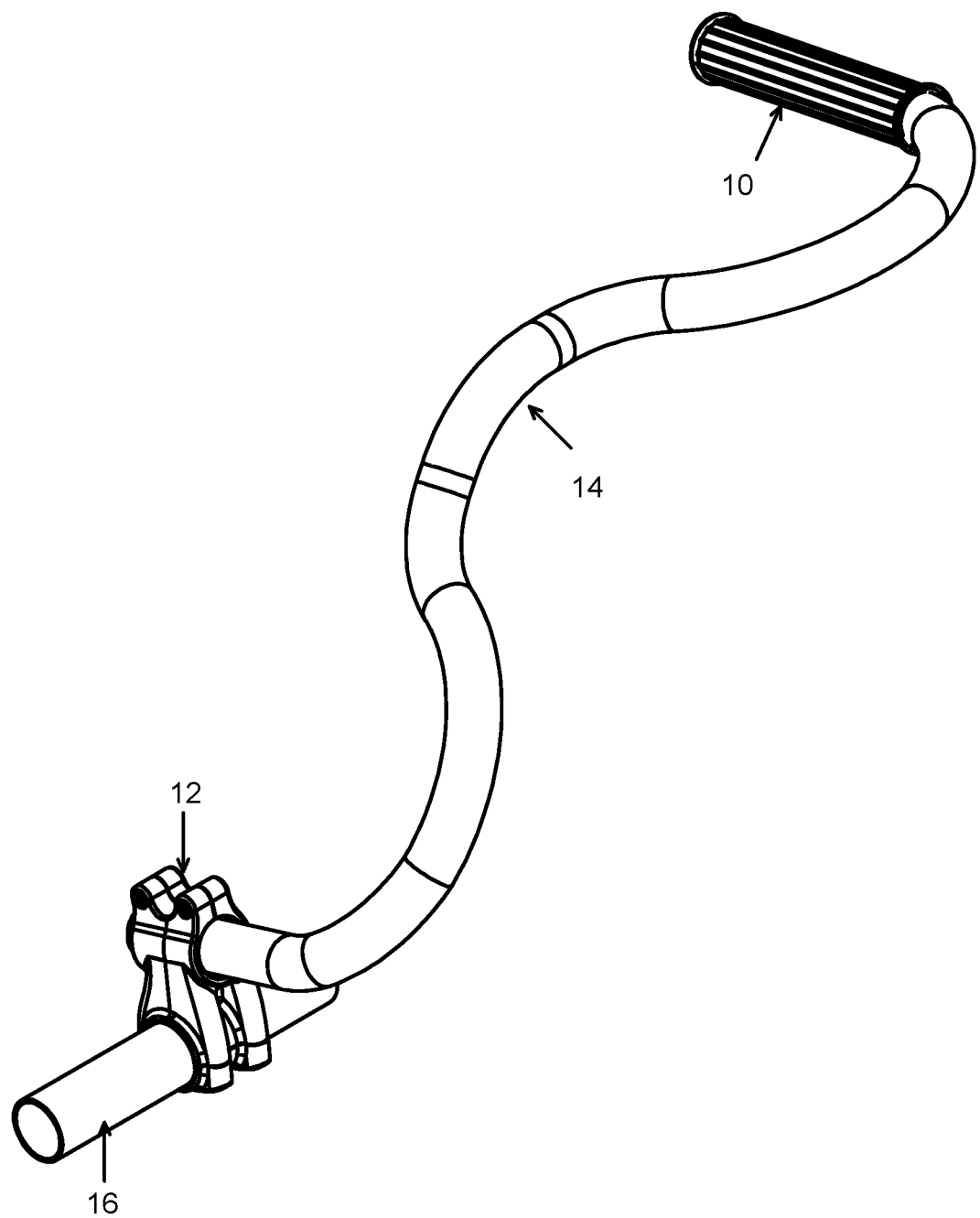

FIG. 4 depicts the device herein attached to main shaft 16 of a grass trimmer or grass edger wherein that portion wherein the device is coupled to main shaft 16 has been cut away from the device. Ergonomic grip 10 is formed to be easily and strongly gripped by a user without causing fatigue and/or strain. Ergonomic grip 10 is shown positioned above main shaft 16 and perpendicular to main shaft 16. Clamping mechanism 12 may be any mechanism that allows the device to be coupled firmly to main shaft 16. The point wherein clamping mechanism 12 clamps onto main shaft 16 is fulcrum F2 upon which the user manipulates trimmer head 7. Shaft 14 runs the length from clamping mechanism 12 to ergonomic grip 10. Shaft 14 may be curved to allow a user to place a second hand upon the device to enable a user to manipulate the grass trimmer or grass edger in a sweeping manner. Shaft 14 is formed so that ergonomic grip 10 is positioned above or to the side of main shaft 16.

Figure 6:
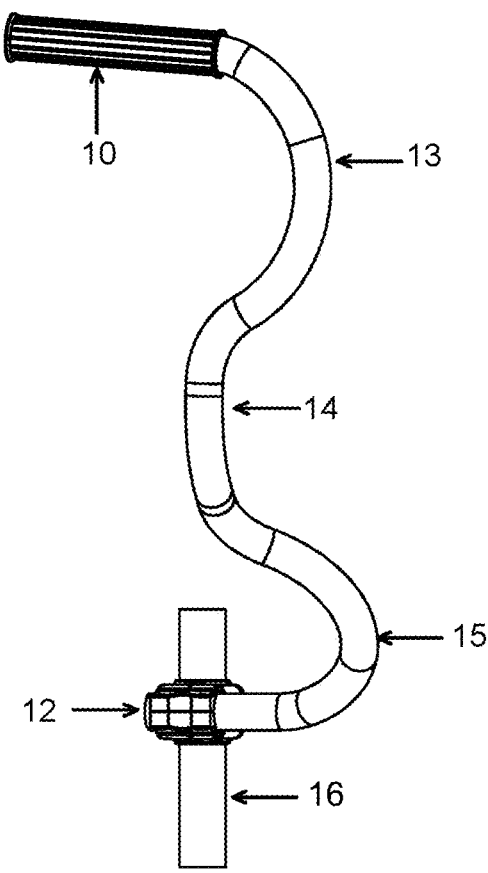

FIG. 6 depicts a top view of the device of FIG. 4. Clamping mechanism 12 couples the device to main shaft 16. Ergonomic grip 10 is shown perpendicular to main shaft 16. But, a user may rotate shaft 14 so that ergonomic grip 10 is parallel to main shaft 16, or some position between perpendicular and parallel, as noted above. Shaft 14 includes curved segments 13 and 15 that are connected to each other by second handle 17, which allows a user to place a hand upon the shaft when needed to permit better control over the movement of the grass trimmer or edger.

Figure 5:
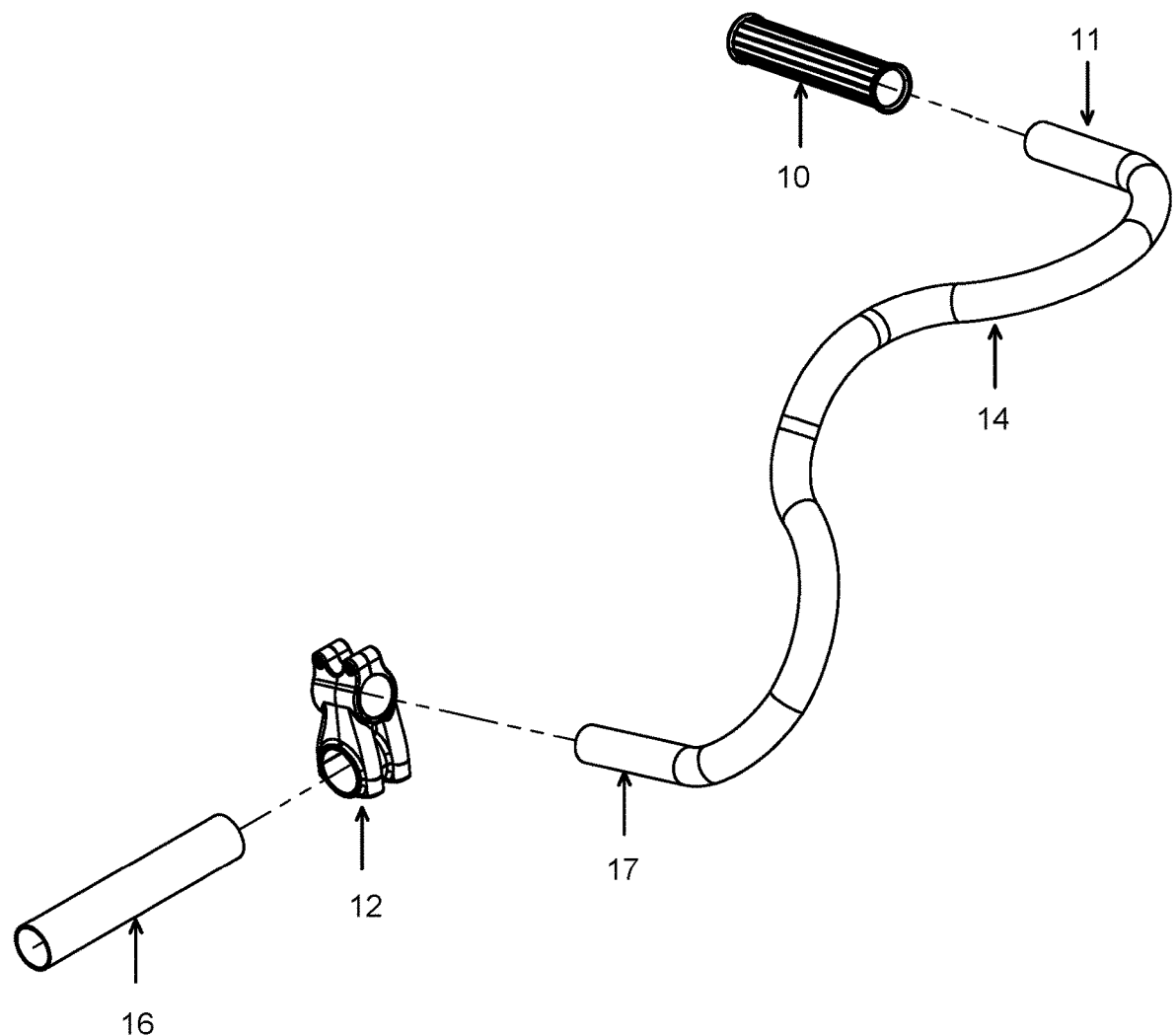
Figure 7:
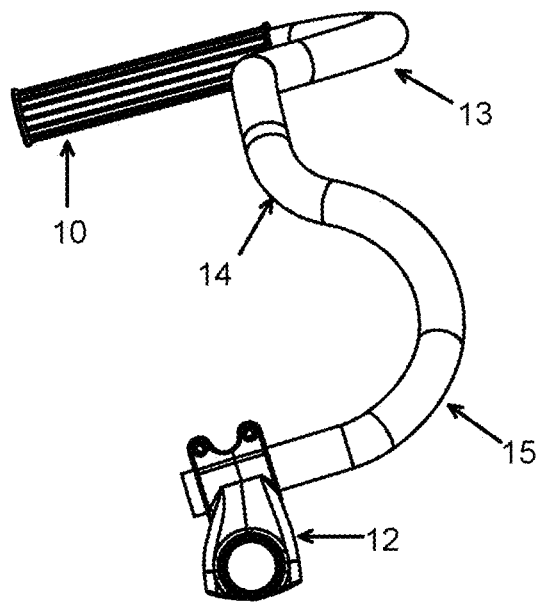
Figure 8:
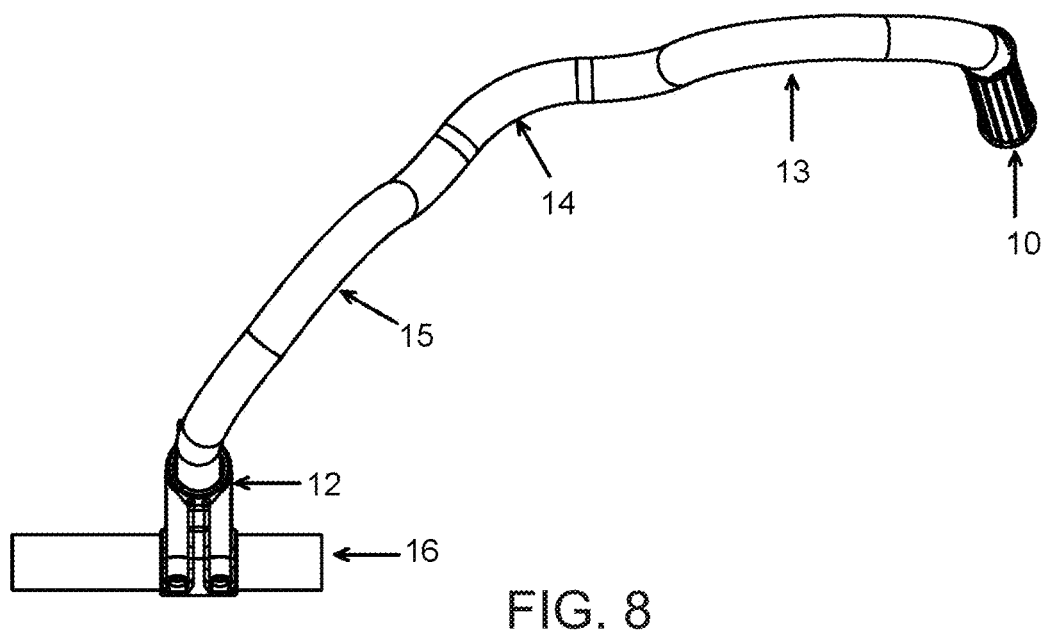

A bottom view of the device is shown in FIG. 7. Note that ergonomic grip 10 is perpendicular to second handle 17. Curved segments 13 and 15 curve from ergonomic grip 10 and clamping mechanism 12, respectively, to second handle 17. A side view of the device of FIG. 5 is shown in FIG. 8. Ergonomic grip 10 is perpendicular to both main shaft 16 and second handle 17. Clamping mechanism 12 clamps the device onto main shaft 16. Curved segments 13 and 15 allow second handle 17 to run parallel to main shaft 16.

Figure 9:
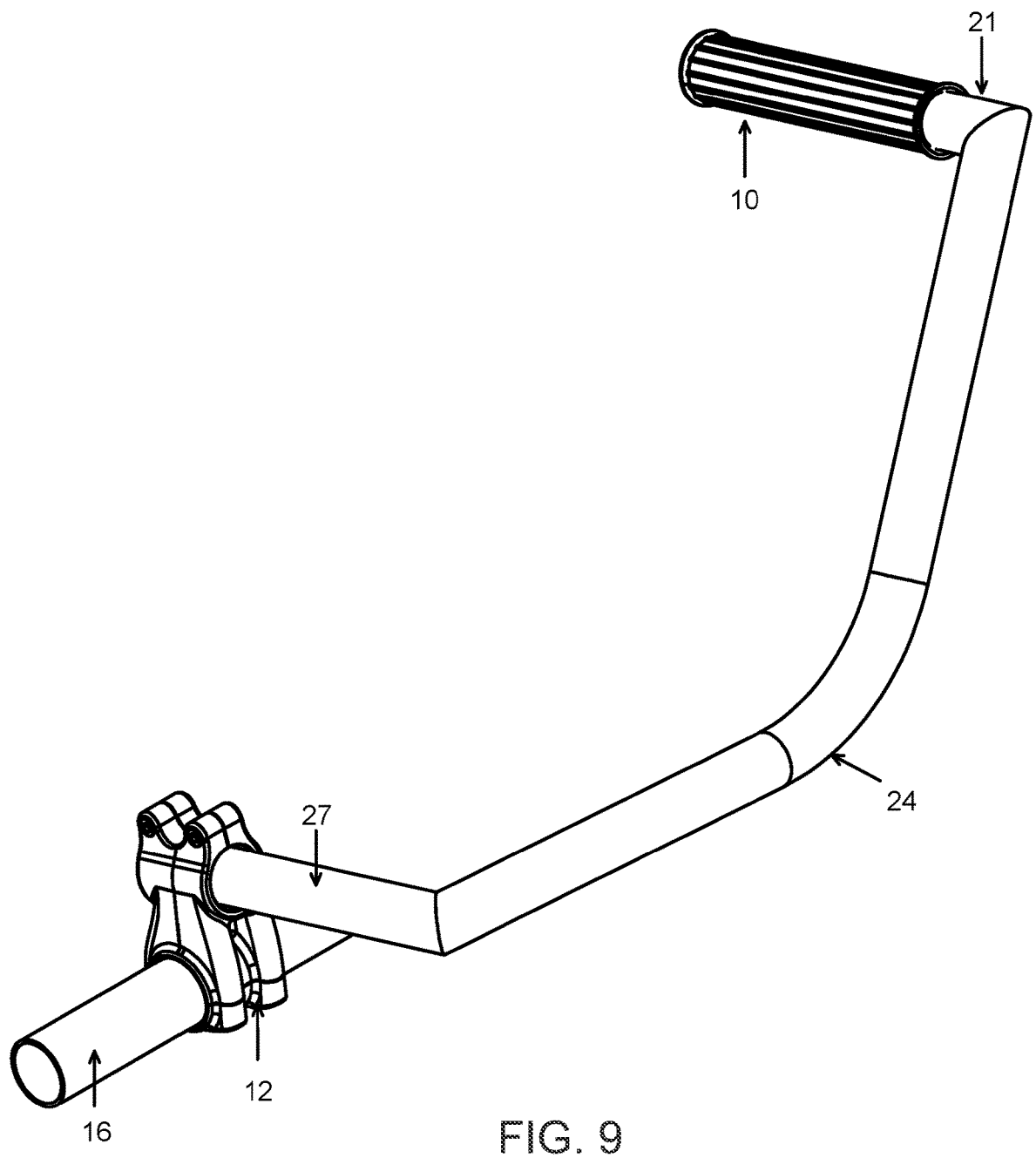

An angled, side view of an alternate embodiment of the device with angled shaft 24 cut away from main shaft 16 of the grass trimmer is shown in FIG. 9. Ergonomic grip 10 is perpendicular to main shaft 16. Clamping mechanism 12 clamps the device onto main shaft 16. Clamping mechanism 12 may be reversibly clamped onto main shaft 16 in any desired position including at an angle extending perpendicular to standard grip 4 (not shown). Alternatively, the device may be clamped onto main shaft 16 so that ergonomic grip 10 is parallel to standard grip 4 (shown in FIGS. 2 and 3). Angled shaft 24 allows ergonomic grip 10 to be positioned above or to the side of standard grip 4. Angled shaft 24 may be formed at an angle less than perpendicular so that ergonomic grip 10 may be gripped by a user so that the user's hand is perpendicular to main shaft 16. Angled shaft 24 may be composed of aluminum, steel, or any other material of sufficient strength to support the operation of a weed trimmer or edger. And, angled shaft 24 may be coated with a material to make it easier for a user to grip along the length of angled shaft 24.

Figure 10:
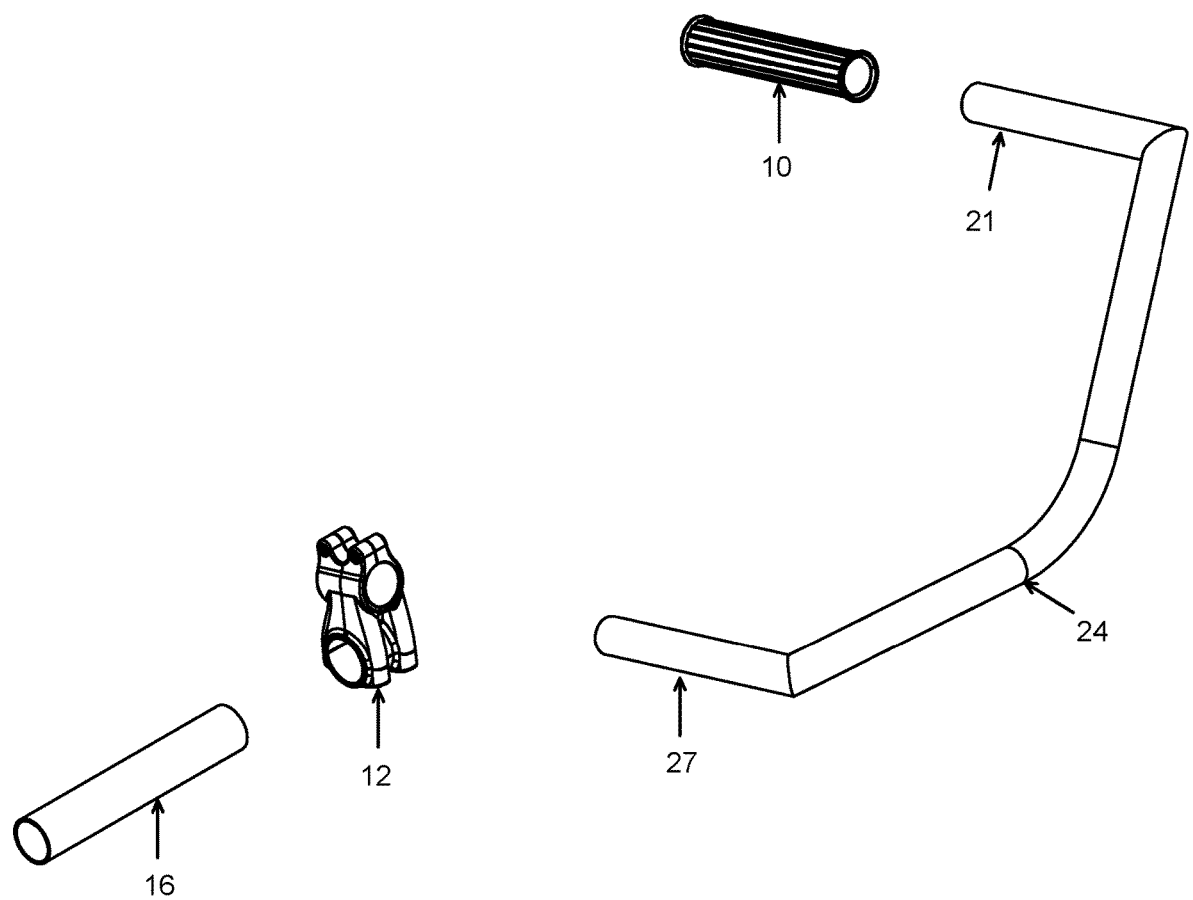

An exploded view of FIG. 9 is depicted in FIG. 10. Angled shaft 24 is coupled to ergonomic shaft 21 and clamping shaft 27. Ergonomic grip 10 is positioned onto ergonomic shaft 21. Clamping shaft 27 fits within clamping mechanism 12. Clamping mechanism 12 fits onto main shaft 16 of the trimmer/edger device. Angled shaft 24 positions ergonomic grip 10 so that a user may grip the weed trimmer or edger device with less stress and strain on a user's back and waist than with a standard weed trimmer or edger grip.

Figure 11:
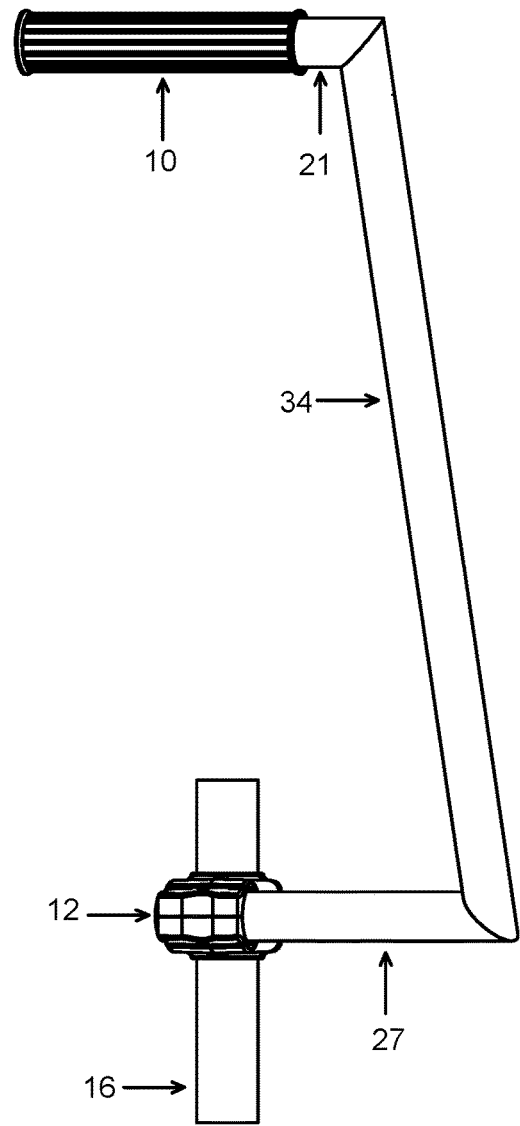
Figure 12:
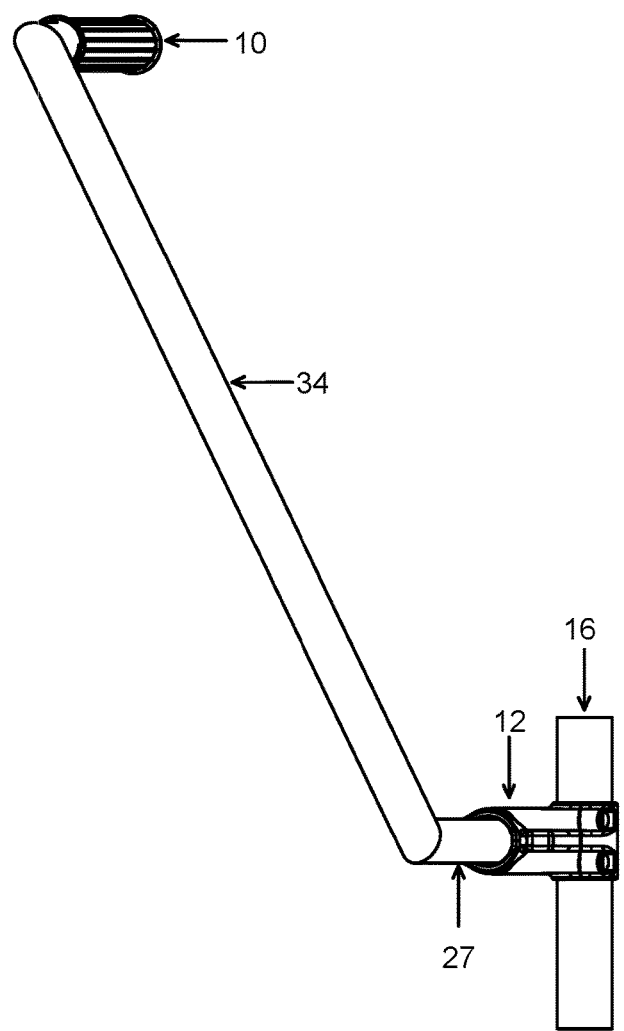

FIG. 11 shows a top view of the device of FIG. 3, while FIG. 12 depicts a side view. FIG. 11 illustrates straight shaft 34 positioning ergonomic grip 10 perpendicular to main shaft 16. Ergonomic grip 10 is formed onto or coupled with ergonomic shaft 21. Straight shaft 34 connects ergonomic grip 10 to clamping shaft 27. Straight shaft 34 extends ergonomic grip 10 above main shaft 16. Clamping mechanism 12 may be reversibly positioned along main shaft 16 positioning ergonomic grip 10 in a position that is comfortable during operation of the trimmer or edger. Additionally, clamping mechanism 12 may be positioned about main shaft 16 so that ergonomic grip 10 is either parallel, perpendicular, or some position between parallel and perpendicular relative to standard grip 4. The position that a user grips ergonomic grip 10 may be manipulated relative to main shaft 16 by rotating clamping shaft 27 within clamping mechanism 12, which alters the angle that a user grips the device.

Clamping mechanism 12 permits the device to be reversibly coupled to main shaft 16. Both ergonomic shaft 21 and clamping shaft 27 may run perpendicular to main shaft 16. FIG. 12 depicts ergonomic grip 10 above and perpendicular to main shaft 16. The angle of the device relative to main shaft 16 may be manipulated by rotating clamping shaft 27 within clamping mechanism 12.

Figure 13:
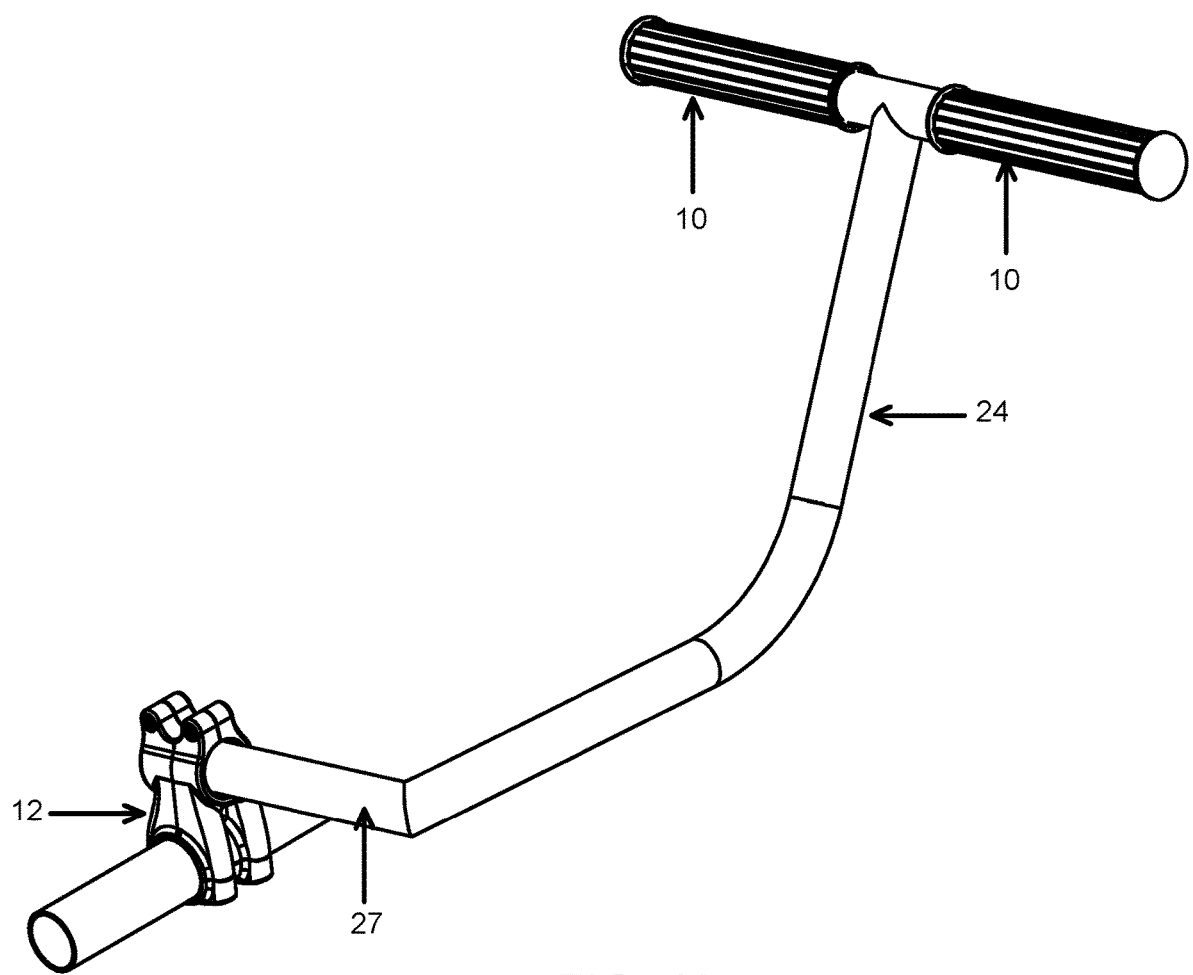

A side, angled view of the device of FIG. 9 with a "T" shaped handle is shown in FIG. 13. Angled shaft 24 includes two ergonomic grips 10 opposite each other forming a "T" shape. The "T" shape allows a user to have more flexibility in gripping the weed trimmer or edger during operation. Ergonomic grip 10 and clamping shaft 27 are parallel to each other and perpendicular to angled shaft 24. Clamping mechanism 12 is secured onto clamping shaft 27.

Referring to FIGS. 14-18, a handle mounting apparatus 100 is shown. The handle mounting apparatus 100 may also be referred to herein as a handle mounting bracket 100 or accessory 100. The handle mounting apparatus 100 is configured to be coupled to the main shaft 16 of a weed trimmer or the main shaft of another implement having a shaft similar to that of a weed trimmer, such as, for example a poled hedge trimmer. In certain embodiments, the handle mounting apparatus 100 may be coupled to the main shaft 16 closer to a distal end (e.g., where the trimmer head 7 is located) than to a proximal end (e.g., where the motor is located).

The handle mounting apparatus 100 may include a mounting portion 120, a receiving portion 140, and a coupling mechanism 160. The mounting portion 120 may also be referred to herein as a first portion 120. The receiving portion 140 may also be referred to herein as a handle receiving portion 140 or a second portion 140. The mounting portion 120 may have a first mounting end 122 and a second mounting end 124 positioned opposite the first mounting end 122. The first mounting end 122 may include a first mounting surface 126 and a first semicylindrical channel 128 defined in the first mounting surface 126. The first mounting surface 126 may also be referred to herein as a mounting surface 126. The first semicylindrical channel 128 may also be referred to herein as a channel 128. The second mounting end 124 may include a first engagement surface 130 oriented perpendicular to the first mounting surface 126.

The receiving portion 140 may have a first receiving end 142 and a second receiving end 144 positioned opposite the first receiving end 142. The first receiving end 142 may include a second engagement surface 146. The second engagement surface 146 may be configured to engage the first engagement surface 130 of the mounting portion 120. The second receiving end 144 may include a shaft receptacle 148 open in a direction perpendicular to the second engagement surface 146. The shaft receptacle 148 may be configured to receive an end 106 of the shaft 104 of the handle 102 (shown in FIG. 18). The handle 102 may further include a grip portion 108 oriented perpendicular to the shaft 104.

The shaft receptacle 148 may include clamping mechanism 154 configured to clamp the end 106 of the shaft 104 of the handle 102 within the shaft receptacle 148. The clamping mechanism 154 may feature one or more fasteners configured to close a gap defined along a side of the shaft receptacle 148 (e.g., such that a circumference of the shaft receptacle 148 is adjusted to tighten around the shaft 104 of the handle 102). In other optional embodiments, the clamping mechanism may feature different configurations or other elements as known in the art.

Each of the first and second engagement surfaces 130, 146 of the mounting portion 120 and the receiving portion 140, respectively, may include a plurality of radial ridges 132, 150 extending from an outer portion 134, 152 of the first and second engagement surfaces 130, 146, respectively. The outer portion 134, 152 of each of the first and second engagement surfaces 130, 146 may be defined circumferentially about each of the first and second engagement surfaces 130, 146. The pluralities of radial ridges 132, 150 of the first and second engagement surfaces 130, 146 are configured to mate as a Hirth joint and prevent rotational movement between the mounting portion 120 and the receiving portion 140 when mated.

The coupling mechanism 160 may be configured to extend through and couple each of the first and second engagement surfaces 130, 146 together. The coupling mechanism may further be configured to selectively enable pivotal movement between the mounting portion 120 and the receiving portion 140. The coupling mechanism 160 may include a threaded fastener 162 and a hand knob 164 configured to engage the threaded fastener 162. The hand knob 164 may also be referred to herein as a captive knob 164. The threaded fastener 162 may be configured to extend through a central hole 170 defined through each of the first and second engagement surfaces 130, 146. The hand knob 164 may be configured to selectively clamp the pluralities of radial ridges 132, 150 of the first and second engagement surfaces 130, 146 together, such that an angle 172 between the mounting portion 120 and the receiving portion 140 is fixed. The angle 172 may be adjusted when the hand knob 164 is loosened.

In certain optional embodiments, the coupling mechanism 160 may further include a spring 166. The spring 166 may be configured to be positioned between the first and second engagement surfaces 130, 146 surrounding the threaded fastener 162 interiorly of the outer portions 134, 152. The spring 166 may be configured to separate or bias the pluralities of radial ridges 132, 150 of the first and second engagement surfaces 130, 146 away from each other when the hand knob 164 is loosened. The spring 166 may enable the angle 172 to be more easily adjusted when the hand knob 164 is loosened.

Figure 14:
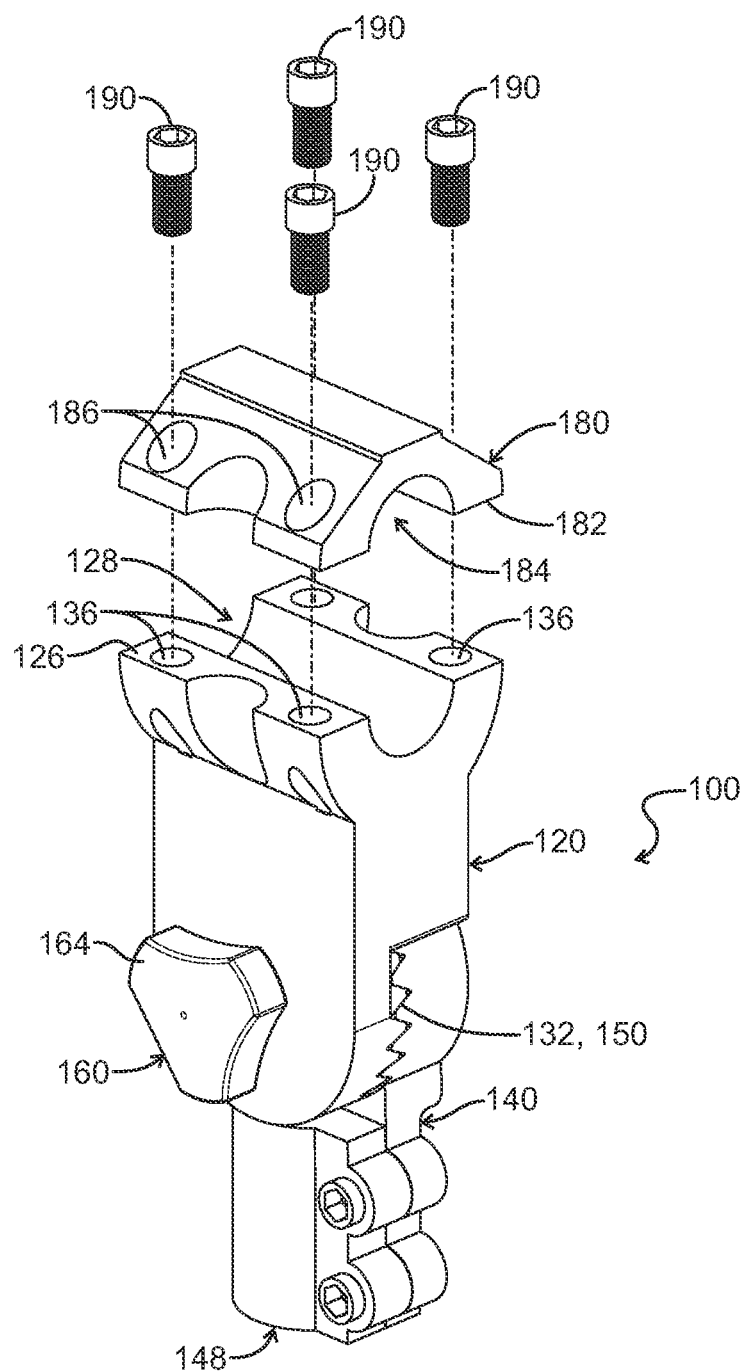
FIG. 14 is a perspective view of a handle mounting apparatus in accordance with the present disclosure.

In certain optional embodiments, as shown in FIG. 14, the handle mounting apparatus 100 may further include a coupling member 180. The coupling member 180 may include a second mounting surface 182 and a second semicylindrical channel 184 defined in the second mounting surface 182. The second mounting surface 182 may be configured to mate with the first mounting surface 126 of the mounting portion 120 for clamping the main shaft 16 of the weed trimmer therebetween. For example, the first and second semicylindrical channels 128, 184 when mated may define a cylindrical passageway configured to receive the main shaft 16 of the weed trimmer.

In certain optional embodiments, the coupling member 180 may be coupled to the mounting portion 120, for example, using coupling fasteners 190. The coupling fasteners may pass through a plurality of coupling holes 186 defined through the second mounting surface 182 of the coupling member and engage a plurality of mounting holes 136 defined in the first mounting surface 126 of the mounting portion 120. The plurality of coupling holes 186 are configured to align with the plurality of mounting holes 136. The plurality of mounting holes 136 may be tapped such they may engage the coupling fasteners 190. The plurality of mounting holes 136 may also be referred to herein as a plurality of tapped mounting holes 136.

Figure 15:
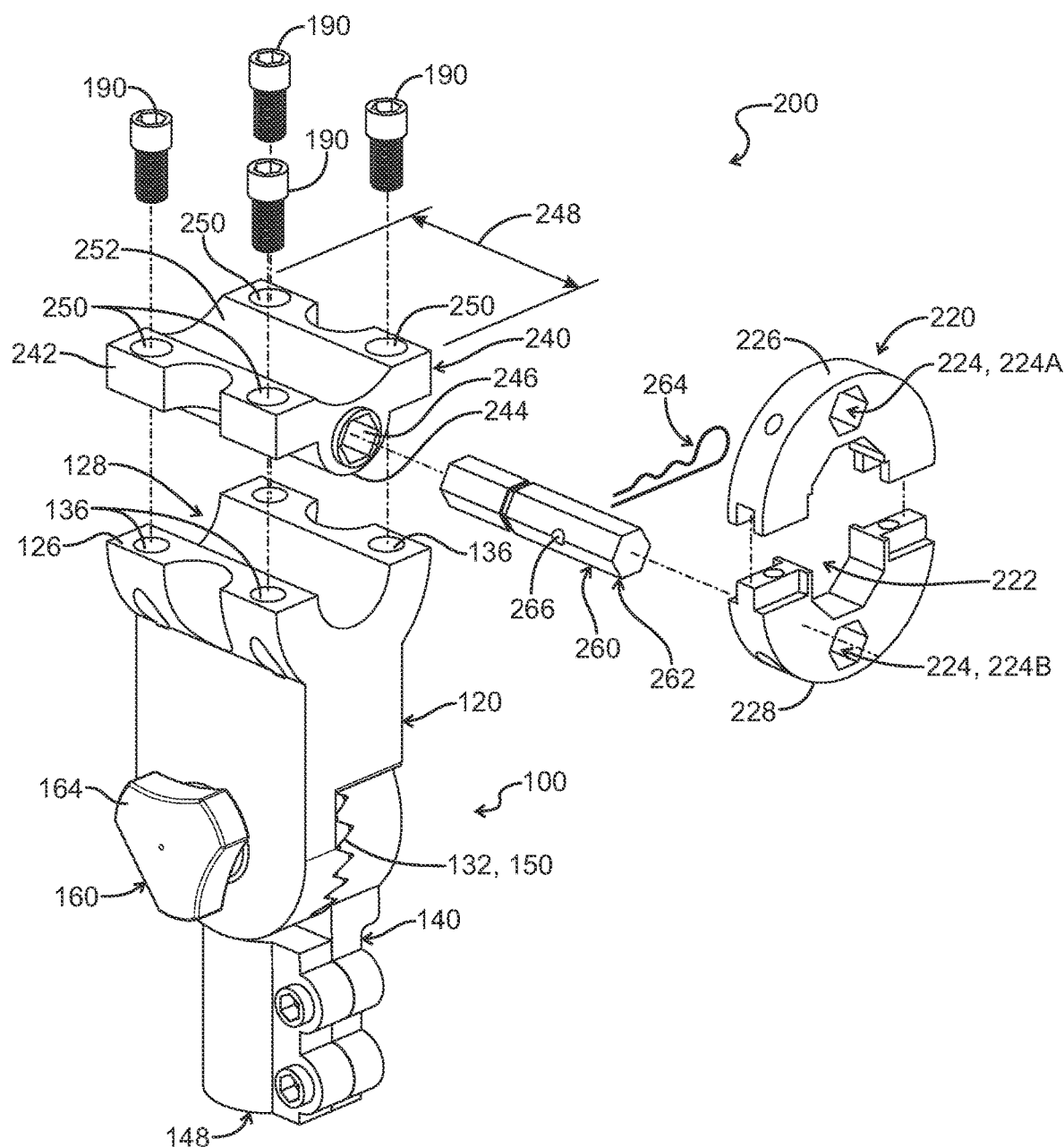
FIG. 15 is a perspective view of the handle mounting apparatus of FIG. 14 in combination with an exploded perspective view of an accessory attachment apparatus in accordance with the present disclosure.
Figure 16:
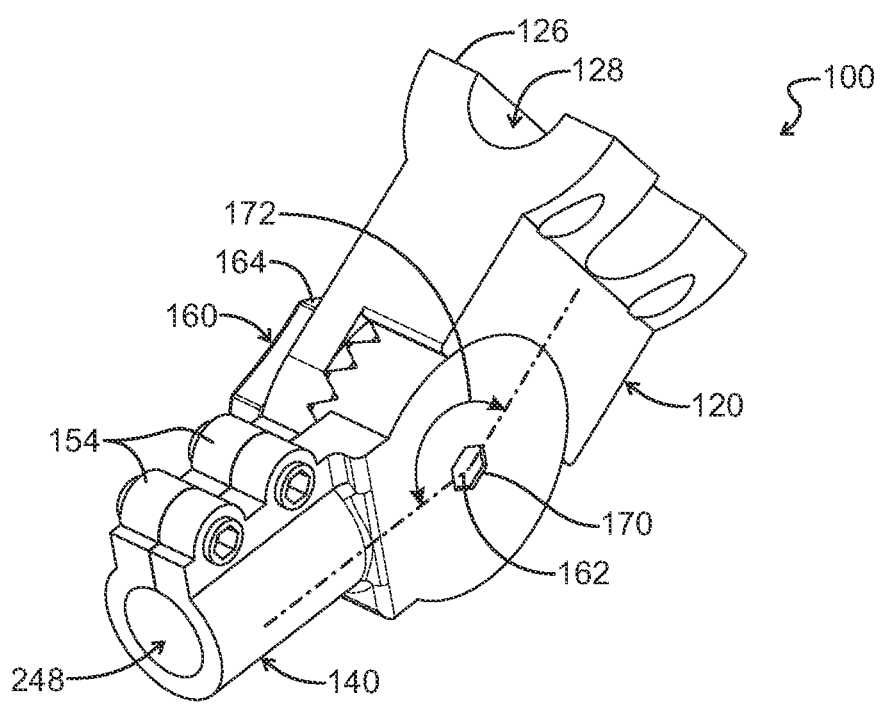
FIG. 16 is a perspective view of the handle mounting apparatus of FIG. 14 in an angled configuration in accordance with the present disclosure.
Figure 17:
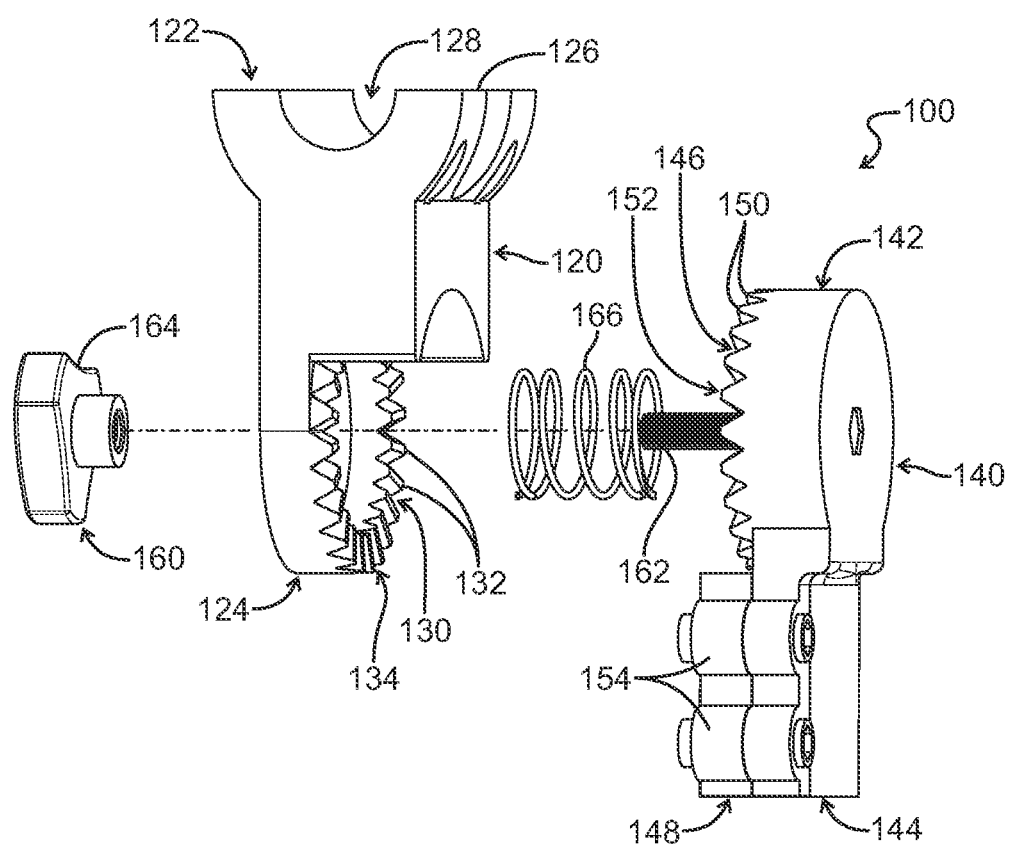
FIG. 17 is an exploded view of the handle mounting apparatus of FIG. 14 in accordance with the present disclosure.
Figure 18:
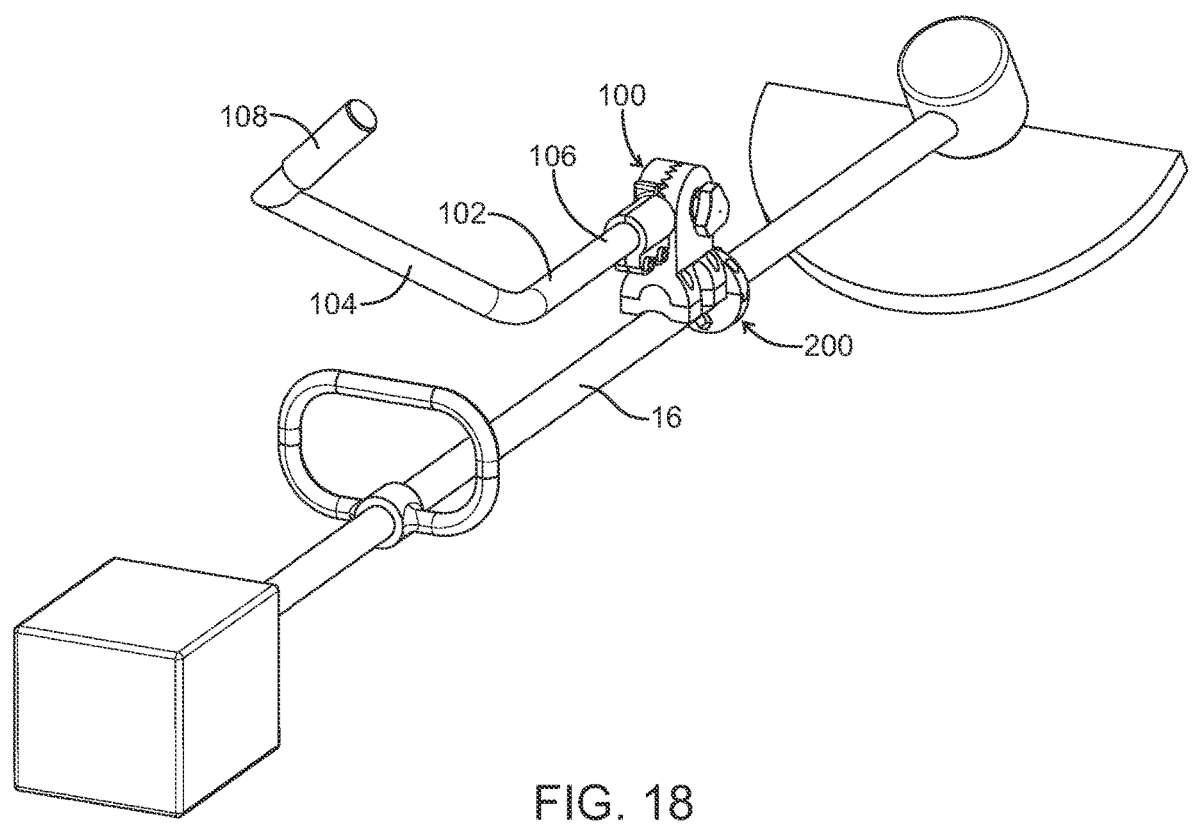
FIG. 18 is a perspective view of the handle mounting apparatus of FIG. 14 coupled to a weed trimmer in accordance with the present disclosure.

In other optional embodiments, as shown in FIG. 15, the handle mounting apparatus 100 may be coupled to the main shaft 16 of the weed trimmer using an attachment apparatus 200. The attachment apparatus 200 may also be referred to herein as an accessory attachment apparatus 200. The attachment apparatus 200 may be configured to be coupled to the main shaft 16 of the weed trimmer or the main shaft of another implement having a shaft similar to that of a weed trimmer, such as, for example a poled hedge trimmer. The attachment apparatus 200 may include a shaft collar clamp 220, an accessory attachment member 240, and a coupling rod 260.

The shaft collar clamp 220 may include a passageway 222 and at least one attachment hole 224. The passageway 222 may be configured to receive the main shaft 16 of the weed trimmer, such as, for example, closer to the distal end than to the proximal end as discussed above. The at least one attachment hole 224 may be defined through the shaft collar clamp 220 parallel to the passageway 222.

The accessory attachment member 240 may include a base portion 242 and a semicylindrical portion 244. The semicylindrical portion 244 may also be referred to herein as a semicylindrical protrusion 244. The semicylindrical portion 244 may be shaped to fit within the semicylindrical channel 128 of the mounting portion 120 of the handle mounting apparatus 100. The accessory attachment member 240 may further include an indentation 252 defined in the base portion 242 opposite the semicylindrical portion 244. The indentation 252 may also be referred to herein as a channel 252. The indentation 252 may be the same length as the length 248 of the semicylindrical portion 244. The indentation 252 may accommodate a portion of the main shaft 16 of the weed trimmer and may further include an arcuate shape similar to that of a portion of the main shaft 16.

The coupling rod 260 may be configured to extend from the accessory attachment member 240. The coupling rod 260 may be configured to be received by the at least one attachment hole 224 of the shaft collar clamp 220. In certain optional embodiments, the coupling rod 260 may be integrally formed with the accessory attachment member 240.

In other optional embodiments, the accessory attachment member 240 may include a receptacle 246 defined at least partially in the semicylindrical portion 244. The receptacle 246 may be configured to receive the coupling rod 260. The receptacle 246 may extend parallel to a length 248 of the semicylindrical portion 244.

Each of the at least one attachment hole 224 of the shaft collar clamp 220, the receptacle 246 of the accessory attachment member 240, and the coupling rod 260 may be hexagonal in order to prevent rotation movement of the accessory attachment member 240 relative to the shaft collar clamp 220. In other optional embodiments, the shape of each of these elements may be different while maintaining the goal of preventing rotational movement between the accessory attachment member 240 and the shaft collar clamp 220.

A free end portion 262 of the coupling rod 260 may be configured to extend through the at least one attachment hole 224 of the accessory attachment member 240. The free end portion 262 of the coupling rod 260 may be configured to receive a locking member 264, such as, for example, a cotter or hair pin. The locking member 264 may be configured to lock the coupling rod 260 within the at least one attachment hole 224 such that the coupling rod 260 cannot be removed from the at least one attachment hole 224. The locking member 264 may be configured to be receive through a bore hole 266 defined through the free end portion 262. In other optional embodiments, the locking member 264 may be received by a circumferential channel (not shown) defined around the free end portion 262 of the coupling rod 260.

As illustrated, the shaft collar clamp 220 may be defined by a first semicircular portion 226 and a second semicircular portion 228 configured to be coupled to the first semicircular portion 226. The passageway 222 may, for example, be defined by two semicylindrical channels, each of which is defined in different ones of the first and second semicircular portions 226, 228.

The at least one attachment hole 224 may include a first attachment hole 224A defined through the first semicircular portion 226 and a second attachment hole 224B defined through the second semicircular portion 228. The first and second attachment holes 224A, 224B may be positioned on opposite sides of the passageway 222. The first attachment hole 224A may enable the accessory attachment member 240 to be attached above the main shaft 16 of the weed trimmer for normal trimming use thereof. Alternatively, the second attachment hole 224B may enable the accessory attachment member 240 to be attached below the main shaft 16 of the weed trimmer for edging use thereof.

The accessory attachment member 240 may include a plurality of attachment holes 250 extending through the base portion 242 on opposite sides of the semicylindrical portion 244. The plurality of attachment holes 250 are configured to align with the plurality of mounting holes 136. The accessory attachment member 240 may be coupled to the mounting portion 120 of the handle mounting apparatus 100, or any other accessory, for example, using the coupling fasteners 190. The coupling fasteners 190 may pass through the plurality of attachment holes 250 and engage the plurality of mounting holes 136 defined in the first mounting surface 126 of the mounting portion 120.

Throughout the specification and claims, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may.

Although embodiments of the present invention have been described in detail, it will be understood by those skilled in the art that various modifications can be made therein without departing from the spirit and scope of the invention as set forth in the appended claims.

The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

It will be understood that the particular embodiments described herein are shown by way of illustration and not as limitations of the invention. The principal features of this invention may be employed in various embodiments without departing from the scope of the invention. Those of ordinary skill in the art will recognize numerous equivalents to the specific procedures described herein. Such equivalents are considered to be within the scope of this invention and are covered by the claims.

All of the compositions and/or methods disclosed and claimed herein may be made and/or executed without undue experimentation in light of the present disclosure. While the compositions and methods of this invention have been described in terms of the embodiments included herein, it will be apparent to those of ordinary skill in the art that variations may be applied to the compositions and/or methods and in the steps or in the sequence of steps of the method described herein without departing from the concept, spirit, and scope of the invention. All such similar substitutes and modifications apparent to those skilled in the art are deemed to be within the spirit, scope, and concept of the invention as defined by the appended claims.

The previous detailed description has been provided for the purposes of illustration and description. Thus, although there have been described particular embodiments of a new and useful invention, it is not intended that such references be construed as limitations upon the scope of this disclosure except as set forth in the following claims.

What is claimed is:

1. An attachment apparatus configured to be coupled to a main shaft of a weed trimmer, the main shaft including a proximal end and a distal end to which a trimmer head is attached opposite the proximal end, the attachment apparatus comprising:
    a shaft collar clamp including a passageway configured to receive the main shaft of the weed trimmer and at least one attachment hole defined through the shaft collar clamp parallel to the passageway;
    an accessory attachment member having a base portion and a semicylindrical portion extending from the base portion;
    a coupling rod extending from the accessory attachment member, the coupling rod configured to be received by the at least one attachment hole of the shaft collar clamp; and
    a handle mounting bracket couplable to the accessory attachment member, the handle mounting bracket including:
        a first portion having a mounting surface configured to engage the base portion of the accessory attachment member, a channel defined in the mounting surface and configured to receive the semicylindrical portion of the accessory attachment member, and a first engagement surface positioned opposite and perpendicular to the mounting surface;
        a second portion having a second engagement surface configured to engage the first engagement surface and a shaft receptacle positioned opposite and perpendicular to the second engagement surface; and
        a coupling mechanism configured to couple and limit rotational movement between the first and second engagement surfaces.

2. The attachment apparatus of claim 1, wherein:
the passageway of the shaft collar clamp is defined by a first semicircular portion and a second semicircular portion configured to be coupled to the first semicircular portion.

3. The attachment apparatus of claim 2, wherein:
the at least one attachment hole includes a first attachment hole defined through the first semicircular portion and a second attachment hole defined through the second semicircular portion.

4. The attachment apparatus of claim 1, wherein:
the accessory attachment member includes a receptacle defined at least partially in the semicylindrical portion; and
the coupling rod is received by the receptacle of the accessory attachment member.

5. The attachment apparatus of claim 4, wherein:
the at least one attachment hole of the shaft collar clamp is hexagonal; the receptacle of the accessory attachment member is hexagonal; and the coupling rod is hexagonal to fit within the at least one attachment hole and prevent rotational movement of the of the accessory attachment member relative to the shaft collar clamp.

6. The attachment apparatus of claim 4, wherein:
the receptacle of the accessory attachment member extends parallel to a length of the semicylindrical portion.

7. The attachment apparatus of claim 1, wherein:
a free end portion of the coupling rod is configured to extend through the at least one attachment hole; and the free end portion of the coupling rod is configured to receive a locking member, the locking member configured to lock the coupling rod within the at least one attachment hole.

8. The attachment apparatus of claim 7, wherein:
the locking member comprises a cotter pin configured to be received through a bore hole defined through the free end portion of the coupling rod.

9. The attachment apparatus of claim 1, wherein:
the shaft collar clamp is configured to be coupled closer to the distal end of the main shaft than to the proximal end of the main shaft.

10. The attachment apparatus of claim 1, wherein:
each of the first and second engagement surfaces includes a plurality of radial ridges extending from an outer portion of each of the first and second engagement surfaces; and
the pluralities of radial ridges of the first and second engagement surfaces define a Hirth joint when mated.

11. The attachment apparatus of claim 10, wherein:
the coupling mechanism includes a threaded fastener and a hand knob configured to engage the threaded fastener;
the threaded fastener is configured to extend through a central hole defined through each of the first and second engagement surfaces; and
the hand knob is configured to selectively clamp the pluralities of radial ridges of the first and second engagement surfaces together.

12. The attachment apparatus of claim 11, wherein:
the coupling mechanism further includes a spring configured to be positioned between the first and second engagement surfaces and surround the threaded fastener; and
the spring is configured to separate the pluralities of radial ridges of the first and second engagement surfaces when the hand knob is loosened for adjusting an angle between first and second portions of the handle mounting bracket.

13. The attachment apparatus of claim 1, wherein:
the accessory attachment member includes a plurality of attachment holes extending through the base portion on opposite sides of the semicylindrical portion; and
the mounting surface of the first portion of the handle mounting bracket includes a plurality of mounting holes configured to align with the plurality of attachment holes of the accessory attachment member for receiving coupling fasteners.

* * * * *